(12) United States Patent
Yu et al.

(10) Patent No.: US 6,804,418 B1
(45) Date of Patent: Oct. 12, 2004

(54) PETITE SIZE IMAGE PROCESSING ENGINE

(75) Inventors: Qing Yu, Rochester, NY (US); Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 678 days.

(21) Appl. No.: 09/705,565

(22) Filed: Nov. 3, 2000

(51) Int. Cl.[7] .................................................. G06T 3/40
(52) U.S. Cl. ...................... 382/299; 382/172; 382/260; 382/264; 382/293; 382/298; 382/299; 345/698; 358/451
(58) Field of Search ................................ 382/298, 293, 382/264, 260, 172, 299; 358/451; 345/698

(56) References Cited

U.S. PATENT DOCUMENTS

| | | | |
|---|---|---|---|
| 4,656,664 A | | 4/1987 | Anderson et al. ............. 382/47 |
| 5,063,448 A | * | 11/1991 | Jaffray et al. ................ 348/578 |
| 5,117,293 A | * | 5/1992 | Asada et al. .................. 358/2.1 |
| 5,438,431 A | | 8/1995 | Ostromoukhov ............ 358/457 |
| 5,485,289 A | * | 1/1996 | Curry .......................... 358/2.1 |
| 5,646,741 A | * | 7/1997 | Horiuchi et al. ............ 358/3.27 |
| 5,703,621 A | * | 12/1997 | Martin et al. ................ 345/690 |
| 5,754,697 A | * | 5/1998 | Fu et al. ....................... 382/232 |
| 5,790,096 A | * | 8/1998 | Hill, Jr. ....................... 345/600 |
| 6,133,902 A | * | 10/2000 | Ohkubo et al. ............. 345/690 |
| 6,253,326 B1 | * | 6/2001 | Lincke et al. ............... 713/201 |
| 6,563,513 B1 | * | 5/2003 | Yu et al. ....................... 345/698 |

FOREIGN PATENT DOCUMENTS

| | | | |
|---|---|---|---|
| EP | 0 895 187 A2 | 2/1999 | ............. G06T/3/40 |
| EP | 0 946 049 A1 | 9/1999 | ........... H04N/1/405 |
| EP | 1 052 598 A2 | 11/2000 | ............. G06T/3/40 |

OTHER PUBLICATIONS

"Halftone Image Printing at Low Resolution" by Pirkko Oittinen and Hannu Saarelma. Proceedings of the international congress on Advances in Non Impact Printing Technologies. San Francisco, Aug. 24–28, 1986, Springfield, SPSE, US, vol. Congress 3, Aug. 24, 1986, pp. 568–575.

"Interactive scaling control mechanism for World–Wide Web systems" by Takao Shimada, Naoko Iwami, Takewo Tomokane, Mitsuo Hayashi, Yasuyuki Kuwahara. Computer Networks and ISDN Systems, North Holland Publishing, Amsterdam, NL, vol. 29, No. 8–13, Sep. 1, 1997, pp. 1467–1477.

* cited by examiner

*Primary Examiner*—Leo Boudreau
*Assistant Examiner*—Dennis Rosario-Vasquez
(74) *Attorney, Agent, or Firm*—David M. Woods

(57) ABSTRACT

A digital image processing method for generating a low resolution, low bit depth digital image from a higher resolution, higher bit depth input color digital image, includes the steps of: generating a gray scale image from the input color digital image; generating a low resolution sketch image from the grayscale image; generating a low resolution halftone image from the gray scale image; and combining the low resolution sketch image and the low resolution halftone image to form the low resolution, low bit depth digital image.

25 Claims, 4 Drawing Sheets

PETITE SIZE IMAGE PROCESSING ENGINE

FIELD OF THE INVENTION

This invention relates to the field of digital image processing, and more particularly to methods for producing very low resolution, low bit depth images.

BACKGROUND OF THE INVENTION

It would be desirable to display consumer images on the display panels of cellular telephones and personal digital assistants (PDA's). Unfortunately, the displays on currently available cellular telephones and personal digital assistants have a very low resolution (e.g. 95×45 to 302×98 pixels) and low bit depth (e.g. 1 bit). A digital image of a high resolution (e.g. 1536×1024 pixels) and a high bit depth (e.g. 24 bits) can be produced by a digital camera or by scanning a consumer film. If it is subsampled to the resolution of the small display and halftoned to produce a 1-bit depth binary image, the features in the resulting image are rendered indistinctly.

One approach to producing a low resolution, low bit depth digital image is to first reduce the bit depth of the image using the "stamp filter" available in Adobe Photoshop™, and then sub-sample the image to reduce the resolution. It is believed that the stamp filter employs a rank order filter and a thresholding operation to reduce the bit depth of the image. The resulting images, when displayed on a cellular telephone or PDA, tend to have too much dark areas, obscuring details in these dark areas.

There is a need therefore for an improved method of processing digital images to produce low resolution, low bit depth images.

SUMMARY OF THE INVENTION

The need is met according to the present invention by providing a digital image processing method for generating a low resolution, low bit depth digital image from a higher resolution, higher bit depth input color digital image that includes the steps of: generating a gray scale image from the input color digital image; generating a low resolution sketch image from the grayscale image; generating a low resolution halftone image from the gray scale image; and combining the low resolution sketch image and the low resolution halftone image to form the low resolution, low bit depth digital image.

ADVANTAGES

The present invention has the advantage of producing a low resolution low bit depth digital image that is recognizable for its scene/event content on a mobile device with limited display area and bit depth.

DETAILED DESCRIPTION OF THE INVENTION

The present invention relates to a Petite Size Image Processing Engine (PSIPE) for generating a low resolution, low bit depth digital image from a higher resolution, higher bit depth input color digital image. The low resolution, low bit depth digital image can be transmitted to cellular telephones and PDA's through wireless channel and viewed on the display panels of cellular telephones and PDA's. The method of the present invention is preferably implemented in a programmed digital computer. The programming techniques for producing a program based on the following description are well known in the art.

Figure 1:
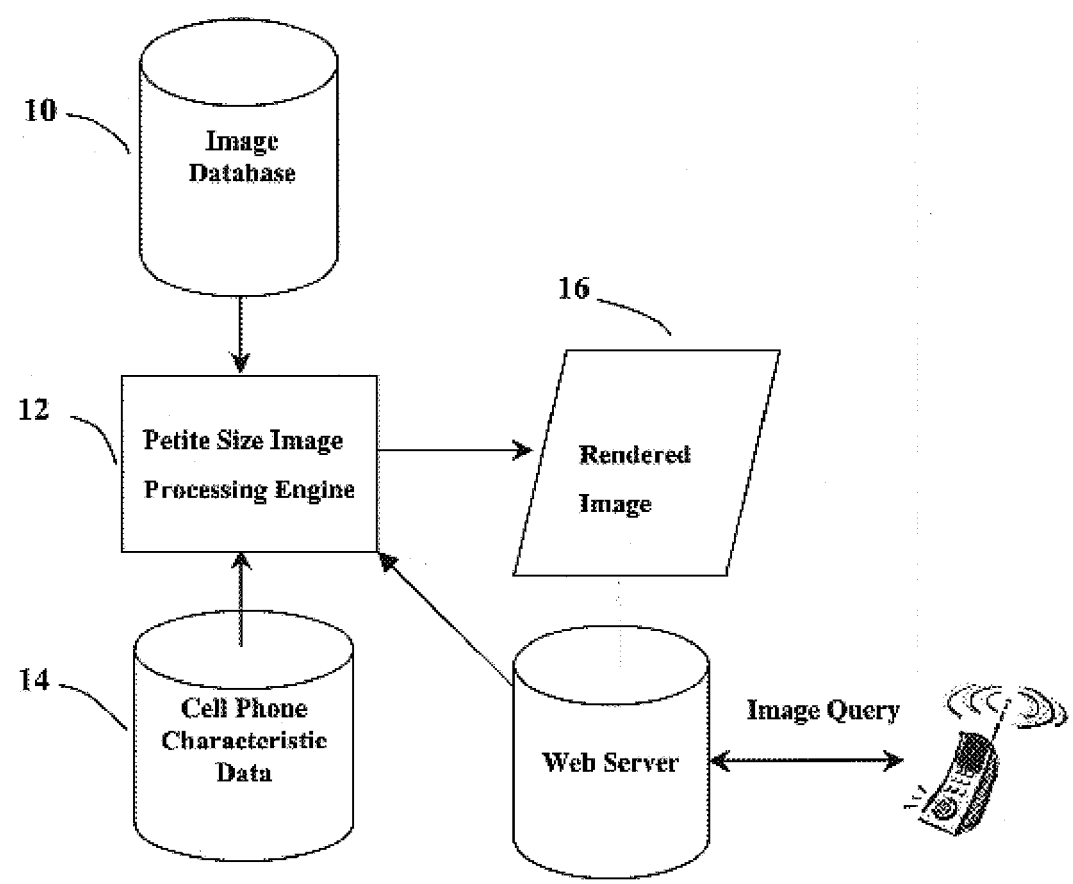
FIG. 1 is a schematic diagram illustrating a system according to the present invention.

Referring to FIG. 1, a typical system architecture for processing, transmitting, and displaying digital images to handheld devices such as cellular telephones and PDA's is shown. The Petite Size Image Processing Engine (PSIPE) consists a single process 12 that applies to the input images from an image database 10 adequate rendering components (pre-processing followed by spatial/bit-depth decimation) given the cell phone display characteristics being extracted from a database 14. The engine then outputs a rendered image 16 that suits the cell phone screens.

Figure 2:
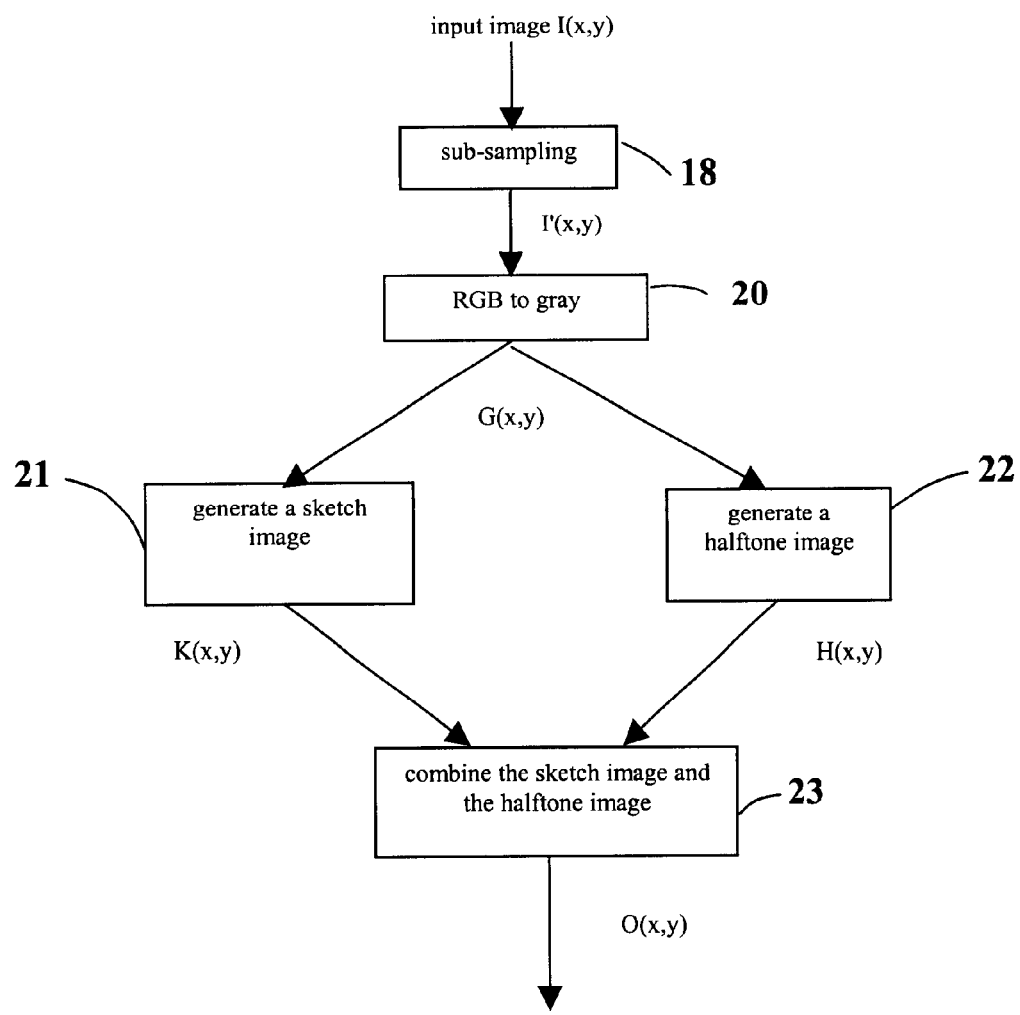
FIG. 2 is a flow chart illustrating the method of processing a digital image according to the present invention.

Referring to FIG. 2, in accordance with the present invention, an input color digital images I(x,y) in the Image Database will be processed by PSIPE before being transmitted to cellular telephones and PDA's. Typically, I(x,y) is a digital image of high resolution (e.g. 1536×1024 pixels) and high bit depth (e.g. 24 bits) produced by a digital camera or by scanning a consumer film. If the size of I(x,y) is larger than a predetermined size (e.g. 480×320), I(x,y) is first subsampled 18 to generate an input color digital image I'(x,y) of the predetermined size; otherwise, I'(x,y) will be same as I(x,y). I'(x,y) will then be converted 20 to a gray scale image G(x,y). A typical equation used to generate a gray scale image from a RGB image is given as following:

$$G(x,y)=aR'(x,y)+bG'(x,y)+cB'(x,y)$$

where R'(x,y), G'(x,y) and B'(x,y) are the red, green and blue channels of the input digital color image I'(x,y). A typical set of coefficients according to the NSTC standard is a=0.3, b=0.59, and c=0.11.

The gray scale image can be further enhanced prior to further processing. For example, the display panels of cellular telephones and PDA's, in general, are not as bright as those of desktop computers and TV sets. Consequently, image quality may be degraded if the images to be displayed are not bright enough. Thus, it is reasonable to lighten up the gray scale image to a predetermined level if it is too dark. A simple approach to address this problem comprises the following steps:

1. calculate the average of the gray scale image; and
2. if the average of the gray scale image is below a predetermined value X by Y, add Y to the value of each pixel of the gray scale image, and clip the modified pixel values to the 8 bit range.

Next, a sketch image 21 and a halftone image 22 are generated from the gray scale image, respectively. After that, the binary sketch image and the binary halftone image are combined 23 to produce a combined image, which remains binary and has the desired low resolution of the display of the cellular telephones or PDA's. The combined image is then ready to be displayed on the display of the cellular telephones or PDA's.

Various halftone techniques may be used to generate a halftone image from a gray scale image, including error diffusion and blue noise dithering. The preferred halftone technique for this invention is error diffusion. To generate a halftone image, the gray scale image G(x,y) is first subsampled to the desired low resolution of the display of the cellular telephones or PDA's, then the subsampled gray scale image is halftoned with the error diffusion technique to produced a halftone image H(x,y).

Detail steps to generate a sketch image from the gray scale image are given below.

Figure 3:
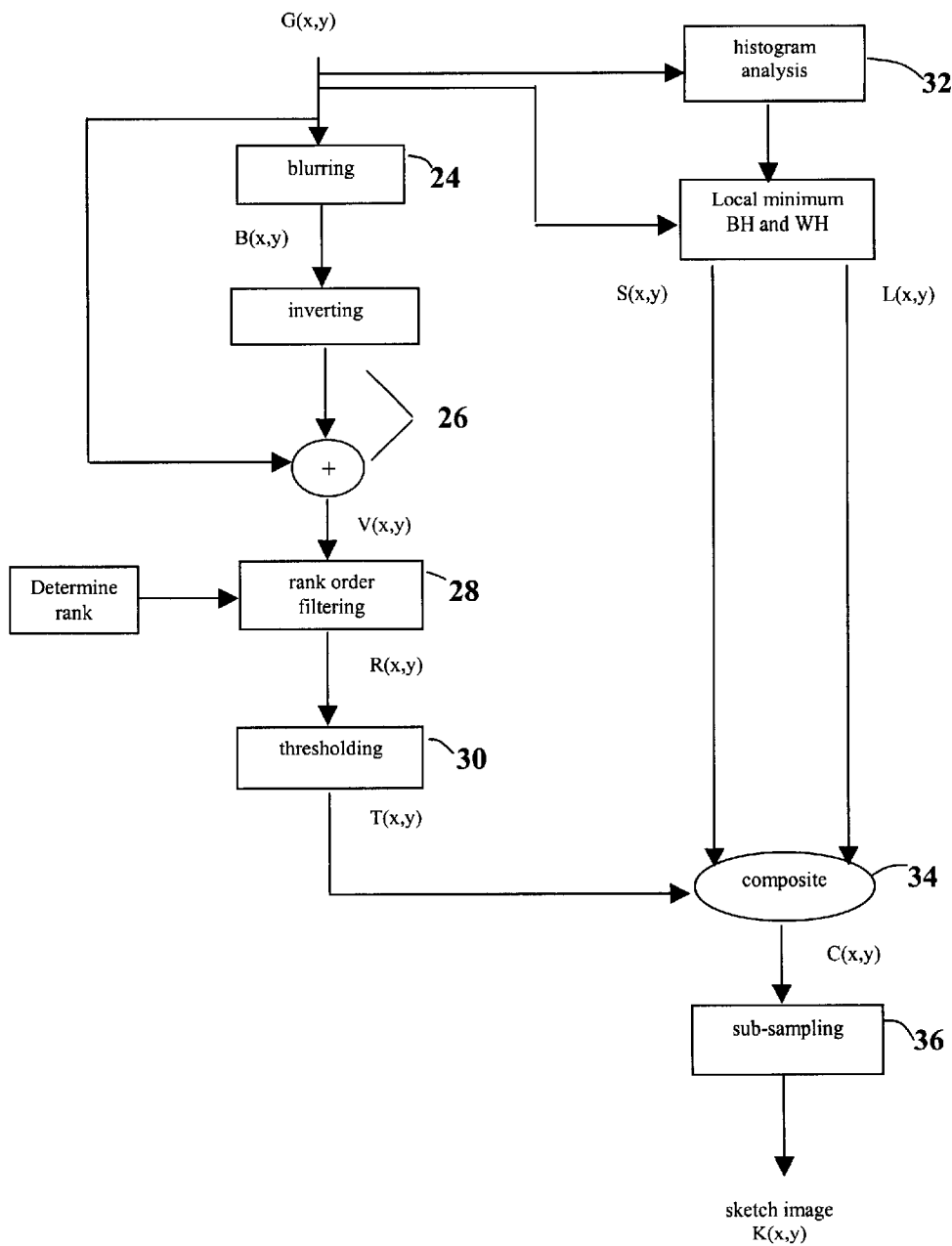
FIG. 3 is a flow chart illustrating a preferred method for generating a sketch image used with the present invention.

Referring to FIG. 3, a valley image V(x,y) is generated from the gray scale image G(x,y). A typical way to generate a valley image from a gray scale image consists of the following steps:

a) blurring 24 the gray scale image G(x,y) to generate a blurred gray scale image B(x,y);

b) subtracting 26 the blurred gray scale image B(x,y) from the gray scale image G(x,y) to generate the valley image V(x,y).

The valley image V(x,y) is then filtered 28 with a rank order filter to produce a filtered valley image R(x,y). The rank order filtering is performed using a kernel running across the image. The kernel size, shape, and the rank for the rank filter are set based on the resolution and bit depth of the display of the corresponding cellular telephones and PDA's. Specifically, the subsampling factor F, i.e. the ratio of the pre-determined size (e.g. 480×360) and the size of the display panel, plays an important role. Typically, a square-shaped kernel of 7×7 pixels is used. If desirable, a circular kernel or any other specifically-shaped kernels can be used. The features in the final low resolution, low bit depth digital image should be at least one pixel wide to be visible, therefore the corresponding features in the filtered valley image R(x,y) need to be at least F pixels wide in order to survive the subsampling. Typically, if the subsampling factor F is 4 in each direction, the $15^{th}$ ranked pixel in an ascending order within the 7×7kernel (a total of 49 pixels) is selected to replace the value of the pixel the current kernel is centered at. If the subsampling factor F is higher, a lower ranked value should be used; and vise versa. For example, if F=1 (no subsampling), the $25^{th}$ (median in a 7×7kernel) ranked value is appropriate; if F=2, the $21^{st}$ ranked value is selected; if F=3, the $18^{th}$ ranked values is selected; and so on.

The filtered valley image R(x,y) is further thresholded 30 to generate a binary valley image T(x,y). The preferred threshold for this operation is 250.

From the gray scale image G(x,y), a histogram H is generated 32. H is further smoothed to generate a smoothed histogram H'. The preferred smoothing technique is a 7 by 1 moving window. From the smoothed histogram H', the first local minimum BH from the shadow end (corresponding to low intensity values) is located as well as the first local minimum WH from the highlight end (corresponding to high intensity values). Next, a shadow image S(x,y) is generated from the gray scale image G(x,y) such that all the pixels with values below BH are set to zero, and a highlight image L(x,y) is generated from the gray scale image G(x,y) such that all the pixels with values above WH are set to one.

A composite binary image C(x,y) is further generated 34 from the binary valley image T(x,y), the shadow image S(x,y) and the highlight image L(x,y) in the following way:

a) if a pixel value in the shadow image S(x,y) is a zero, set the corresponding pixel value in the composite binary image C(x,y) to zero;

b) if a pixel value in the highlight image L(x,y) is a one, set the corresponding pixel value in the composite binary image C(x,y) to one; and c) otherwise, set the corresponding pixel value in the composite binary image C(x,y) to the value of the binary valley image T(x,y).

The composite binary image C(x,y) is then sub-sampled 36 to a sketch image K(x,y) with the desired low resolution of the display of the cellular telephones or PDA's.

Finally, the sketch image K(x,y) and the halftone image H(x,y), are combined to produce a combined image O(x,y). The combining step comprises the steps of:

i) if the pixel value is black in the sketch image, assigning the corresponding pixel value in the combined image to black;

ii) if the pixel value is white and a neighboring pixel value is black in the sketch image, assigning the corresponding pixel value in the combined image to white; and iii) if the pixel value is white and all the neighboring pixel values are white in the sketch image, assigning the corresponding pixel value in the combined image to the value of the corresponding pixel in the halftone image.

The combined image, which is binary and with the desired low resolution of the display of the cellular telephones or PDA's, is then ready to be displayed on the display of the cellular telephones or PDA's.

Figure 4:
FIG. 4 shows several illustrations of images at different stages in the method and system as shown in the preceding figures.

In order to illustrate the result of the foregoing processing, FIG. 4 shows an input image 40, a low resolution, low bit depth image 42 produced by sub-sampling and halftoning, a low resolution, low bit depth image produced by "stamp-filtering" and sub-sampling 44, and a low resolution, low bit depth image 46 produced by the method of the present invention.

The invention has been described with reference to a preferred embodiment. However, it will be appreciated that variations and modifications can be effected by a person of ordinary skill in the art without departing from the scope of the invention.

Parts List 10 an image database
12 Petite Size Image Processing Engine (PSIPE)
14 Cell Phone Characteristic Data
16 rendered images
18 subsampling
20 converting RGB image to gray scale image
21 generating a sketch image
22 generating a halftone image
23 combining the sketch image and the halftone image
24 blurring an image
26 subtracting
28 rank order filtering
30 thresholding
32 histogram analysis
34 compositing
36 sub-sampling
40 an input image
42 a low resolution, low bit depth image produced by sub-sampling and halftoning
44 a low resolution, low bit depth image produced by "stamp-filtering" and sub-sampling
46 a low resolution, low bit depth image produced by the method of the present invention

What is claimed is:

1. A digital image processing method for generating a low resolution, low bit depth digital image from a higher resolution, higher bit depth input color digital image, comprising the steps of:

a) generating a gray scale image from the input color digital image;

b) generating a low resolution sketch image from the grayscale image;

c) generating a low resolution halftone image from the gray scale image; and d) combining each pixel of the low resolution sketch image *i with each corresponding pixel of the low resolution halftone image to form the low resolution, low bit depth digital image.

2. The method claimed in claim 1, wherein the step of generating a low resolution sketch image comprises the steps of:

i) generating a valley image from the grayscale image;

ii) filtering the valley image with a rank order filter to produce a filtered valley image;

iii) thresholding the filtered valley image to generate a binary valley image;

iv) generating a shadow image and a highlight from the gray scale image;

v) combining the shadow image, the highlight image, and the binary valley image to produce a combined binary image; and vi) sub-sampling the combined binary image to generate an output binary image with desired low resolution.

3. The method claimed in claim 1, wherein the step of generating a low resolution halftone image, comprises the steps of;

i) sub-sampling the gray scale image to generate a gray scale image having the desired low resolution; and ii) applying an error diffusion process to the low resolution gray scale image to generate a low resolution halftone image.

4. The method claimed in claim 1, wherein step of generating a low resolution halftone image, comprises the steps of;

i) sub-sampling the gray scale image to generate a gray scale image having the desired low resolution; and ii) applying a blue noise dithering process to the low resolution gray scale image to generate a low resolution halftone image.

5. The method claimed in claim 1, further comprising the step of:

modifying the grayscale image so that the average of the modified grayscale image is a predetermined value and using the modified grayscale image to generate the sketch and halftone images.

6. The method claimed in claim 1, wherein the combining step comprises the steps of:

i) if the pixel value is black in the sketch image, assigning the corresponding pixel value in the combined image to black;

ii) if the pixel value is white and a neighboring pixel value is black in the sketch image, assigning the corresponding pixel value in the combined image to white; and iii) if the pixel value is white and all the neighboring pixel values are white in the sketch image, assigning the corresponding pixel value in the combined image to the value of the corresponding pixel in the halftone image.

7. The method claimed in claim 1, wherein the input digital image is larger than a predetermined size, further comprising the step of first sub-sampling the input digital image to the predetermined size.

8. The method claimed in claim 7, wherein the predetermined size is 480×320 pixels.

9. The method claimed in claim 2, wherein the valley image is generated by:

a) blurring the gray scale image to generate a blurred gray scale image; and b) subtracting the blurred gray scale image from the gray scale image.

10. The method claimed in claim 2, wherein the shadow image and the highlight image are generated by the steps of:

a) generating a histogram of the gray scale image;

b) smoothing the histogram;

c) locating a first minimum in the histogram from either end of the histogram; and d) designating all pixels with values below the first minimum as the shadow image and setting these pixels to zero, and designating all the pixels above the second minimum as the highlight image and setting these values to one.

11. The method claimed in claim 2, wherein the combining step includes the steps of:

a) if a pixel value in the shadow image is a zero, setting the corresponding pixel value in the combined image to zero;

b) if a pixel value in the highlight image is a one, -; setting the corresponding pixel value in the combined image to one; and c) otherwise, setting the corresponding pixel value in the combined image to the value of the binary valley image.

12. A system for communicating and displaying images, comprising:

a) a cellular telephone or PDA having a low resolution, low bit depth display;

b) a communication means for generating a low resolution, low bit depth digital image from a higher resolution, higher bit depth input color digital image using the method claimed in claim 1; and c) a transmitter connected to the server for transmitting the low resolution, low bit depth digital image to the cellular telephone or PDA for display.

13. A computer program product in a computer-readable storage medium for performing the method of claim 1.

14. A digital image processing method for generating a low resolution, low bit depth digital image from a higher resolution, higher bit depth input color digital image, comprising the steps of:

generating a gray scale image from the input color digital image;

generating a low resolution sketch image from the grayscale image;

generating a low resolution halftone image from the gray scale image; and combining the low resolution sketch image and the low resolution halftone image to form the low resolution, low bit depth digital image, wherein said combining further comprises:

if the pixel value is black in the sketch image, assigning the corresponding pixel value in the low resolution, low bit depth digital image to black;

if the pixel value is white and a neighboring pixel value is black in the sketch image, assigning the corresponding pixel value in the low resolution, low bit depth digital image to white; and if the pixel value is white and all the neighboring pixel values are white in the sketch image, assigning the corresponding pixel value in the low resolution, low bit depth digital image to the value of the corresponding pixel in the halftone image.

15. The method claimed in claim 14, wherein the step of generating a low resolution sketch image comprises the steps of:

generating a valley image from the grayscale image;

filtering the valley image with a rank order filter to produce a filtered valley image;

thresholding the filtered valley image to generate a binary valley image;

generating a shadow image and a highlight from the gray scale image;

combining the shadow image, the highlight image, and the binary valley image to produce a combined binary image; and sub-sampling the combined binary image to generate an output binary image with desired low resolution.

16. The method claimed in claim 15, wherein the step of combining the shadow image, the highlight image, and the binary valley image includes the steps of:

if a pixel value in the shadow image is a zero, setting the corresponding pixel value in the combined image to zero;

if a pixel value in the highlight image is a one, setting the corresponding pixel value in the combined image to one; and otherwise, setting the corresponding pixel value in the combined image to the value of the binary valley image.

17. The method claimed in claim 15, wherein the valley image is generated by:

blurring the gray scale image to generate a blurred gray scale image; and subtracting the blurred gray scale image from the gray scale image.

18. The method claimed in claim 15, wherein the shadow image and the highlight image are generated by the steps of:

generating a histogram of the gray scale image;

smoothing the histogram;

locating a first minimum in the histogram from either end of the histogram; and designating all pixels with values below the first minimum as the shadow image and setting these pixels to zero, and designating all the pixels above the second minimum as the highlight image and setting these values to one.

19. The method claimed in claim 14, wherein the step of generating a low resolution halftone image, comprises the steps of:

sub-sampling the gray scale image to generate a gray scale image having the desired low resolution; and applying an error diffusion process to the low resolution gray scale image to generate a low resolution halftone image.

20. The method claimed in claim 14, wherein the step of generating a low resolution halftone image, comprises the steps of:

sub-sampling the gray scale image to generate a gray scale image having the desired low resolution; and applying a blue noise dithering process to the low resolution gray scale image to generate a low resolution halftone image.

21. The method claimed in claim 14, further comprising the step of:

modifying the grayscale image so that the average of the modified grayscale image is a predetermined value and using the modified grayscale image to generate the sketch and halftone images.

22. The method claimed in claim 14, wherein the input digital image is larger than a predetermined size, further comprising the step of first sub-sampling the input digital image to the predetermined size.

23. The method claimed in claim 22, wherein the predetermined size is 480×320 pixels.

24. A system for communicating and displaying images, comprising:

a cellular telephone or PDA having a low resolution, low bit depth display;

a communication means for generating a low resolution, low bit depth digital image from a higher resolution, higher bit depth input color digital image using the method claimed in claim 14; and a transmitter connected to the server for transmitting the low resolution, low bit depth digital image to the cellular telephone or PDA for display.

25. A computer program product in a computer-readable storage medium for performing the method of claim 14.

* * * * *

UNITED STATES PATENT AND TRADEMARK OFFICE
CERTIFICATE OF CORRECTION

PATENT NO. : 6,804,418 B1
DATED : October 12, 2004
INVENTOR(S) : Qing Yu et al.

It is certified that error appears in the above-identified patent and that said Letters Patent is hereby corrected as shown below:

Column 5,
Line 6, delete "*i"

Signed and Sealed this

Thirtieth Day of November, 2004

JON W. DUDAS
*Director of the United States Patent and Trademark Office*